US006686399B1

(12) United States Patent
Kawamura et al.

(10) Patent No.: US 6,686,399 B1
(45) Date of Patent: *Feb. 3, 2004

(54) PROCESS FOR PRODUCING ALKYD RESIN

(75) Inventors: Chicara Kawamura, Hiratsuka (JP); Kei Ito, Hiratsuka (JP); Ichiro Yoshihara, Fujisawa (JP); Nobushige Numa, Ebina (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/069,797

(22) PCT Filed: Oct. 6, 2000

(86) PCT No.: PCT/JP00/06981

§ 371 (c)(1),
(2), (4) Date: Feb. 28, 2002

(87) PCT Pub. No.: WO01/25309

PCT Pub. Date: Apr. 12, 2001

(30) Foreign Application Priority Data

Oct. 7, 1999 (JP) .............................. 11-286707
Oct. 12, 1999 (JP) .............................. 11-288981
Jan. 24, 2000 (JP) ....................... 2000-014694

(51) Int. Cl.⁷ ................................. C08J 11/04
(52) U.S. Cl. ........................................ 521/48; 528/272
(58) Field of Search ............................ 521/48; 528/272

(56) References Cited

U.S. PATENT DOCUMENTS

| 3,951,886 A | 4/1976 | Miyake et al. |
| 5,252,615 A | 10/1993 | Rao et al. |
| 5,726,277 A | 3/1998 | Salsman |
| 5,858,551 A | 1/1999 | Salsman |
| 5,958,601 A | 9/1999 | Salsman |
| 6,127,436 A | 10/2000 | Chatterjee et al. |

FOREIGN PATENT DOCUMENTS

| CA | 2087914 | 7/1993 |
| EP | 0 798 336 | 10/1997 |
| GB | 11466641 | 3/1969 |
| JP | 11-228733 | 8/1999 |

OTHER PUBLICATIONS

CIPO—Canadian Patent Database—Claims—2087914.

*Primary Examiner*—Edward J. Cain
(74) *Attorney, Agent, or Firm*—Wenderoth, Lind & Ponack, LLP

(57) ABSTRACT

Processes for producing within a short time transparent alkyd resins which are substantially free of occurrence of foreign matters or filtration residues are disclosed, which comprise depolymerizing polyester resins whose chief starting material is terephthalic acid and which have been recovered from waste materials and regenerated, with use of a polyhydric alcohol component having tetra- or higher hydric alcohol, and thereafter adding thereto a polybasic acid component (and if necessary a fatty acid component) to effect an esterification reaction.

30 Claims, No Drawings

PROCESS FOR PRODUCING ALKYD RESIN

TECHNICAL FIELD

This invention relates to processes for producing alkyd resins using polyester resins which have been recovered from waste materials such as disused PET bottles and regenerated.

BACKGROUND ART

Heretofore, use of terephthalic acid as the dibasic acid component, which is one of the starting materials of alkyd resins, was more costly than using phthalic acid or phthalic anhydride and the resulting resin was apt to become turbid or develop occurrence of foreign matters. Hence, normally terephthalic acid is not used for alkyd resin production or, if used, in only minor amount. On the other hand, recently disposal of waste is becoming a serious issue and utilization of disused PET bottles by recycling is under study.

A production method of alkyd resins using polyester resins which have been recovered from waste materials such as disused PET bottles and regenerated is described in, for example, Hei 11 (1999)-228733A-JP. Said method comprises subjecting recovered polyester resin and an alkyd resin oligomer having a molecular weight not higher than 5,000 and containing hydroxyl groups to depolymerization and transesterification. However, this method is subject to a number of problems such that it requires advance synthesis of the alkyd resin oligomer, requires many hours for the depolymerization and filtration of ultimately obtained alkyd resin causes occurrence of large amount of filtration residue, because the amount of the alcohol component in the occasion of depolymerization is too low to sufficiently depolymerize the recovered polyester resin.

The object of the present invention is to provide processes for producing transparent alkyd resins which are substantially free of foreign matters and filtration residue within a short time, using the polyester resins which have been recovered from waste materials and regenerated.

DISCLOSURES OF THE INVENTION

We have engaged in concentrative studies with the view to accomplish the above object and now discovered that the object could be fulfilled by conducting depolymerization of said recovered and regenerated polyester resin as dissolved in a mixture or reaction mixture of an alcohol mixture of tetra- or higher hydric alcohol and tri- or lower polyhydric alcohol, or an alcohol component comprising tetra- or higher alcohol, with an oil and fat and/or a fatty acid; and then conducting an esterification reaction by adding a polybasic acid component and if necessary a fatty acid component to the system and come to complete the present invention.

Thus, according to an embodiment of the invention, a process of producing an alkyd resin having an oil length of 30–70% is provided, which is characterized by comprising dissolving a polyester resin, whose chief starting material is terephthalic acid and which has been recovered from waste materials and regenerated, in an alcohol mixture of tetra- or higher hydric alcohol and tri- or lower polyhydric alcohol at a weight ratio as the former/the latter within a range of 0.2–50, depolymerizing the polyester resin in the presence of a depolymerization catalyst, and then adding to the system a polybasic acid component and a fatty acid component to subject them to an esterification reaction, the polyester resin being used in an amount of 5–40% by weight based on the total weight of the polyester resin, the alcohol mixture, the polybasic acid component and the fatty acid component (this process is hereafter referred to as "the first process").

According to another embodiment of the present invention, another process of producing an alkyd resin having an oil length of 30–70% is provided, which is characterized by dissolving a polyester resin, whose chief starting material is terephthalic acid and which has been recovered from waste material and regenerated, in a mixture or reaction product of an alcohol component containing tri- or lower polyhydric alcohol and tetra- or higher hydric alcohol at a weight ratio of the former/the latter within a range of 0–20, with an oil and fat and/or a fatty acid, depolymerizing the polyester resin in the presence of a depolymerization catalyst, and then adding a polybasic acid component to the system to subject them to an esterification reaction, the polyester resin being used in an amount of 5–40% by weight based on the total weight of the polyester resin, the alcohol component, the oil and fat and/or the fatty acid and the polybasic acid component ("the second process").

According to the invention, furthermore, paint compositions containing the alkyd resins which are produced by the above first or second process are provided.

Hereinafter the first and second processes of the invention are explained in further details.

EMBODIMENTS OF THE INVENTION

Those polyester resins made chiefly from terephthalic acid, which have been recovered from waste materials and regenerated, and which are used in the first and second processes of this invention (hereafter the polyester resins may be abbreviated as "regenerated PES") include polyethylene terephthalate (e.g., PET bottles) which are recovered for recycling of resources, industrial waste polyethylene terephthalate, and polyester resins regenerated from the wastes occurring in the course of production of polyester products (film, fibres, automobile parts, electric and electronic parts, etc.) such as polyethylene terephthalate or polybutylene terephthalate made chiefly from terephthalic acid. In particular, recycled polyethylene terephthalate is suitable. The regenerated PES is normally used in the form of chips or pulverized product.

According to the first process of the invention, first such regenerated PES is dissolved in a mixture of a tetra- or higher hydric alcohol and a tri- or lower polyhydric alcohol, and its depolymerization is conducted in the presence of a depolymerization catalyst.

Examples of tetra- or higher hydric alcohols useful in said alcohol mixture include diglycerine, triglycerine, pentaerythritol, dipentaerythritol and sorbitol. Of those, pentaerythritol is particularly suitable because of favorable curing and drying property of the painted film of the paint compositions in which the resulting alkyd resin is used. Also examples of tri- or lower polyhydric alcohols include: trihydric alcohols such as trimethylolpropane, trimethylolethane and glycerine; and dihydric alcohols such as ethylene glycol, diethylene glycol, triethylene glycol, propylene glycol, 1,3-propanediol, 1,4-butanediol, 1,5-pentanediol, neopentyl glycol, 1,6-hexanediol and 1,4-dimethylolcyclohexane. Of those, glycerine, ethylene glycol, diethylene glycol, triethylene glycol and propylene glycol are particularly suitable, from the standpoints of depolymerization ability as used in mixtures with said tetra- or higher hydric alcohols (e.g., pentaerythritol) and low-temperature dissolving ability of high temperature-melting tetra- or higher hydric alcohols.

In the alcohol mixture, blend ratio of the tetra- or higher hydric alcohol to the tri- or lower polyhydric alcohol is conveniently within a range of 0.2–50, preferably 0.5–35, inter alia, 1–20, in terms of weight ratio of the former/the latter.

The blend ratio of said regenerated PES to the alcohol mixture is within a range of 15/85–80/20, in particular, 20/80–70/30, inter alia, 20/80–60/40, in terms of a weight ratio of the former/latter.

On the other hand, in the second process of the invention, said regenerated PES is dissolved in a mixture of an alcohol. component containing a tetra- or higher hydric alcohol as exemplified in the above as the essential constituent and if necessary a tri- or lower polyhydric alcohol as above-exemplified, with an oil and fat and/or a fatty acid, or in an esterification reaction mixture thereof, and is depolymerized in the presence of a depolymerization catalyst. In this specification, the word "esterification" is used in a sense covering both ordinary estirification reaction and ester-interchange reaction.

In the above alcohol component, convenient blend ratio of tri- or lower polyhydric alcohol to tetra- or higher hydric alcohol is, in terms of the former/the latter by weight, within a range of 0–20, preferably 0.02–10, inter alia, 0.05–5.

Examples of the oil and fat, i.e., triglycerides of fatty acids, and/or the fatty acids to be mixed with above alcohol component include the following: as oils and fats, soybean oil, safflower oil, linseed oil, tall oil, coconut oil, palm kernel oil, castor oil, dehydrated castor oil, fish oil and tung oil can be named. In particular, drying or semi-drying oils having iodine values of at least 100 are preferred, inter alia, soybean oil and tall oil are advantageous. As fatty acids, those of soybean oil, safflower oil, linseed oil, tall oil, coconut oil, palm kernel oil, castor oil, dehydrated castor oil, fish oil, and tung oil may be named. Of those fatty acids, those of drying oils or semi-drying oils having iodine values of at least 100, inter alia, those of soybean oil and tall oil, are preferred.

The blend ratio of the oil and fat, and/or the fatty acid with the alcohol component is such that the oil length of the resulting alkyd resin should range 30–70%, preferably 40–60%, for imparting adequate drying property and physical properties of the dry coated films of paint compositions in which the alkyd resin is blended.

In the second process of the invention wherein regenerated PES is mixed with, and dissolved in, an esterification reaction product of the alcohol component with oil and fat, and/or fatty acid, said esterification reaction product is provided by subjecting a mixture of the alcohol component with oil and fat, and/or fatty acid to an esterification reaction in advance. This esterification reaction can be conveniently carried out by any method known per se, in the presence of an esterification catalyst such as zinc acetate, litharge, dibutyltin oxide and the like.

Polyhydric alcohols which are normally solid, such as pentaerythritol, dissolve in the system upon said esterification reaction with fatty acid, to facilitate the dissolving and deployerization of regenerated PES in the next step. Also advance blending of liquid oil and fat in said mixture enables stable progress of the esterification reaction between polyhydric alcohol and fatty acid.

The amount of regenerated PES to be blended in a mixture of the alcohol component and the oil and fat and/or the fatty acid, or an esterification reaction product of said mixture, is normally within a range of 15–80, in particular, 20–70, inter alia, 20–60, parts by weight, per 100 parts by weight of the sum of the regenerated PES, alcohol component, the oil and fat and/or the fatty acid. Here "the sum of the regenerated PES, alcohol component, the oil and fat and/or the fatty acid" signifies, in case of blending the regenerated PES in the esterification product, the combined amount of the sum of the alcohol component and the oil and fat and/or the fatty acid, which are the starting materials of the esterification product, plus the regenerated PES.

As examples of depolymerization catalyst which is used for promoting depolymerization of regenerated PES in the first and second processes of the invention, monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, antimony trioxide, tetrabutyl titanate and tetraisopropyl titanate maybe named. The use rate of the depolymerizaton catalyst in the first process is, per 100 weight parts of the total sum of the regenerated PES and alcohol mixture, conveniently within a range of normally 0.005–2, in particular, 0.05–2, weight parts; and in the second process of the invention, per 100 weight parts of the sum of the regenerated PES, the alcohol component, and the oil and fat and/or the fatty acid, it is normally conveniently within a range of 0.005–5, in particular, 0.05–5, weight parts.

In the first process of the invention, the depolymerization method of regenerated PES by dissolving it in an alcohol mixture is subject to no critical limitation, so long as the regenerated PES can be dissolved in the alcohol mixture and the depolymerization can be effected. For example, a method may be named in which a depolymerization catalyst is blended in an alcohol mixture which is heated to 80–250° C., preferably 100–240° C., and to which regenerated PES is added and together heated to cause its dissolution and depolymerizaton at, for example, 140–250° C., preferably 150–240° C.

According to the first process of the invention, after conducting the dissolution and depolymerization of the regenerated PES, a polybasic acid component and fatty acid component are added to the system to conduct an esterification reaction to form an alkyd resin. In said production of alkyd resin, coloring in the formed alkyd resin can be inhibited by adding to the depolymerization product of the regenerated PES a minor amount, e.g., 0.1–10 weight parts, of a phosphorus compound per 100 weight parts of said depolymerization product in advance. As examples of the phosphorus compound, phosphoric acid, phosphorous acid and hypophosphorous acid; and alkyl esters or phenyl esters of these acids (e.g., trimethyl phosphite, trimethyl phosphate, triphenyl phosphite and triphenyl phosphate) may be named.

As the polybasic acid component, those normally used as the acid component for forming alkyd resins can be similarly used. For example, dibasic acids such as phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride; tri- and higher polybasic acids such as trimellitic anhydride, pyromellitic anhydride, trimesic acid and methylcyclohexenetricarboxylic acid; and $C_1$–$C_6$ (in particular, $C_1$–$C_4$) alkyl esters of those dibasic acids and tri- and higher polybasic acids can be named. Of those, dibasic acids and their $C_1$–$C_6$ (in particular, $C_1$–$C_4$) alkyl esters are preferred.

As the fatty acid component to be used in the alkyd resin production, fatty acid, oil and fat, and the like may be named. As fatty acid, for example, soybean oil fatty acid, safflower oil fatty acid, linseed oil fatty acid, tall oil fatty acid, coconut oil fatty acid, palm kernel oil fatty acid, castor oil fatty acid, dehydrated castor oil fatty acid, fish oil fatty acid and tung oil fatty acid may be named. As examples of useful oil and fat, esters of above fatty acids with glycerine can be named, such as soybean oil, safflower oil, linseed oil, tall oil, coconut oil, palm kernel oil, castor oil, dehydrated castor oil, fish oil and tung oil and the like. Of those fatty acid component, fatty acids of drying oils or semi-drying oils having iodine values of at least 100, inter alia, soybean oil fatty acid and tall oil fatty acid, are preferred.

The blend ratio of the above fatty acid component is such that the oil length of the resulting alkyd resin should range 30–70%, preferably 40–60%, for imparting adequate drying property and physical properties of the dry, coated films of paint compositions in which the alkyd resin is blended. For accomplishing this, generally preferred use ratio of the polyester resin is 5–40%, in particular, 10–35%, inter alia, 10–30%, by weight, based on the total weight of the polyester resin, alcohol mixture, polybasic acid component and the fatty acid component. It is also preferred to use the polybasic acid component and the fatty acid component at such ratios that the carboxyl equivalent numbers in the sum of the polybasic acid component and the fatty acid component per one hydroxyl equivalent in the alcohol mixture falls within a range of 0.8–1, in particular, 0.85–0.99, inter alia, 0.90–0.99, for obtaining favorable water resistance and physical properties of dry coating film formed by applying paint compositions containing said alkyd resin. Here the "carboxyl groups in the sum of polybasic acid component and the fatty acid component" is calculated, where the polybasic acid component is an ester of a polybasic acid, by hydrolyzing the ester and using the formed carboxyl groups.

The esterification reaction for obtaining alkyd resin following the first process of the present invention can be conducted under esterification reaction conditions known per se. For example, a system composed of a depolymerization product of a polyester resin with an alcohol mixture, which is obtained as above-explained, to which the polybasic acid component and fatty acid component are added, is kept at temperatures from about 110° C. to about 260° C., preferably from about 150° C. to 250° C., for about 3 to 10 hours in the presence of an esterification catalyst, to be dehydrated and condensed. As catalyst for the esterification reaction, those earlier named as examples of depolymerization catalyst can be used. The use rate of such esterification catalyst is normally conveniently within a range of 0.005–2% by weight, in particular, 0.05–2% by weight, to the above system.

In the second process of the invention, depolymerization can be effected by such methods as, for example, (1) mixing a mixture of the alcohol component, oil and fat and/or fatty acid with regenerated PES and dissolving the latter to effect the depolymerization, or (2) mixing an esterification reaction product from alcohol component, oil and fat, and/or fatty acid with regenerated PES, and dissolving the latter to carry out the depolymerization. The method (2) is more convenient, in respect of depolymerizability of regenerated PES.

Depolymerization conditions of regenerated PES are not subject to critical limitations, so long as they allow the depolymerization using a depolymerization catalyst. For example, a method comprising adding regenerated PES to a mixture of the alcohol component, oil and fat and/or fatty acid, or an esterification reaction product of said mixture, said mixture or the reaction product thereof being heated to 80–250° C., preferably 100–240° C., and heating the system in the presence of a depolymerization catalyst to, e.g., 140–250° C., preferably 150–240° C., to effect dissolution and depolymerization.

According to the second process of the present invention., alkyd resin can be obtained, after dissolving and depolymerizing regenerated PES in the above-described manner, by adding to this depolymerization product a polybasic acid component similar to the one as was explained in respect of the first process of the present invention to cause esterification reaction thereof.

In said occasion, it is appropriate to use the regenerated PES in such an amount as will render the oil length of resultant alkyd resin within a range of 30–70%, preferably 40–60%, in respect of drying property and physical properties of coated film when made dry coated film. For this purpose, it is generally preferred to use regenerated PES in an amount of 5–40 weight percent, in particular, 10–35 weight percent, inter alia, 10–30 weight percent, based on the sum of the regenerated PES, alcohol component, oil and fat, and/or fatty acid, and polybasic acid component.

It is also convenient for waterproof property and physical properties of coated film when made dry coated film, to make the equivalent number of carboxyl group(s) in the polybasic acid component per equivalent of hydroxyl group in said alcohol component 0.5–1, in particular, 0.6–0.99, inter alia, 0.7–0.99. Here "carboxyl group(s) of polybasic acid component" signifies, where the polybasic acid component is an ester of polybasic acid, the carboxyl group(s) as converted by hydrolysis of said ester.

The esterification reaction for obtaining an alkyd resin following the second process of the present invention can be conducted under esterification reaction conditions known per se. For example, it can be conducted by maintaining a system formed by blending a polybasic acid with a dissolution and depolymerization product from regenerated PES, alcohol component, oil and fat, and/or fatty acid, at about 110°–about 260° C., preferably about 150°–about 250° C., in the presence of an esterification catalyst, for about 3–10 hours to cause dehydration and condensation. As the esterification catalyst, those earlier named as examples of depolymerization catalyst can be used. Suitable blend ratio of the esterification catalyst is normally 0.005–5 weight percent, in particular, 0.05–5 weight percent, to said system.

In the production of alkyd resin, coloration of formed alkyd resin can be inhibited by adding to the depolymerization product of regenerated PES, in advance of the esterification reaction, a minor amount, e.g., 0.1–10 weight parts per 100 weight parts of said product, of a phosphorus compound. As the phosphorus compound, for example, phosphoric acid, phosphorous acid, hypophosphorous acid, alkyl esters or phenyl esters of these acids (e.g., trimethyl phosphite, trimethyl phosphate, triphenyl phosphite, triphenyl phosphate and the like) may be named.

In the above-described first and second processes, after termination of the esterification reaction, the alkyd resin is normally cooled and may be recovered as it is. Whereas, for improving filterability and handling workability, the resin may be diluted with organic solvent and recovered. The kind of organic solvent is not particularly limited, so long as it can dissolve the alkyd resin.

Those alkyd resins obtained by the first and second processes of the present invention are excellent in solubility in organic solvent, are soluble in even such weak solvent as mineral spirits although they contain terephthalic acid component, and are useful as resin binder in paint compositions. Recently overcoatability is attached greater importance and alkyd resins soluble in weak solvent are highly evaluated. The alkyd resins obtained by the processes of the present invention well meet this purpose.

Alkyd resins obtained by the processes of the invention preferably have oil length of 30–70%, in particular, 40–60%;

number-average molecular weight of 2,000–12,000, in particular, 2,500–10,000; hydroxyl value of 10–150 mgKOH/g, in particular, 15–130 mgKOH/g; and an acid value of 1–50 mgKOH/g, in particular, 3–20 mgKOH/g.

Of the alkyd resins obtained by the processes of the present invention, those in which drying oil fatty acids or semi-drying oil fatty acids are used as the fatty acid excel in oxidation-drying property and are conveniently used as resins for room temperature-curing type paints. Where they are used as resins for room temperature-curing type paints, the drying property can be still improved by concurrent use of metal compound dryers such as cobalt naphthenate, zirconium naphthenate, lead naphthenate and the like. The alkyd resins obtained by the processes of the present invention, in particular, those in which saturated fatty acids are used as the fatty acid, can be conveniently used as resins for thermosetting type paints, in combination with curing agents reactable with hydroxyl groups, such as amino resins like melamine resin, polyisocyanate compound, epoxy compound and the like. Paint compositions containing the alkyd resins obtained by the processes of the present invention can be prepared by methods known per se, provided that an alkyd resin of the invention is used as at least a part of the resin binder.

EXAMPLES

Hereinafter the invention is more specifically explained with reference to Examples in which "parts" and "%" are by weight.

Example 1

A reactor equipped with a thermometer, stirrer, heating device and rectification column was charged with 109 parts of pentaerythritol and 107 parts of ethylene glycol, and their temperature was raised to 140° C. under stirring. At this time point the pentaerythritol was dissolved, and into which 1.5 parts of zinc acetate and 154 parts of regenerated polyethylene terephthalate (regenerated PET) were charged by the order stated. Thereafter the temperature was raised to 230° C., and the system was maintained at the same temperature for an hour to effect depolymerization of the regenerated PET. Then the temperature was brought down to 180° C., 354 parts of soybean oil fatty acid and 340 parts of phthalic anhydride were charged and 50 parts of xylene was added for refluxing. After raising the temperature to 180° C., dehydrating condensation reaction was conducted by raising the temperature to 240° C. over a period of 3 hours while removing water, to obtain an alkyd resin. Then conducting cooling and dilution by addition of 600 parts of mineral spirits, an alkyd resin solution having about 62% of non-volatile content and having Gardner viscosity (25° C.) of W was obtained.

Examples 2–5

Example 1 was repeated except that the composition of the blend and the retention time at 240° C. were varied for each Example as in the following Table 1, to obtain in each run an alkyd resin solution having about 62% of non-volatile content.

Example 6

A reactor similar to the one used in Example 1 was charged with 198 parts of pentaerythritol and 40 parts of ethylene glycol and their temperature was raised to 140° C. under stirring. At that time point the pentaerythritol was dissolved, and into which 5 parts of zinc acetate and 5 parts of litharge were charged, and then 159 parts of regenerated polyethylene terephthalate (regenerated PET) was charged. Subsequently the temperature was raised to 230° C. The system was maintained at the same temperature for an hour to effect depolymerization of the regenerated PET. Then the temperature was brought down to 180° C., 348 parts of safflower oil was added, and then temperature was raised to 220° C. and maintained at the same level for an hour. Then the temperature was dropped to 180° C., 307 parts of phthalic anhydride was charged, and 50 parts of xylene was added for refluxing. The temperature was once again raised to 180° C., and the dehydrating condensation reaction was conducted by raising the temperature to 240° C. over a period of 3 hours while removing water, to obtain an alkyd resin.

Subsequently conducting cooling and dilution by addition of 700 parts of mineral spirits, an alkyd resin solution having about 58% of non-volatile content and having Gardner viscosity (25° C.) of Z was obtained.

Example 7

Example 2 was repeated except that 2 parts of trimethyl phosphate was added after depolymerization of regenerated PET, to obtain an alkyd resin solution having 62% of non-volatile content and having Gardner viscosity (25° C.) of Y.

Comparative Example 1

A reactor similar to the one used in Example 1 was charged with 149 parts of pentaerythritol and 78 parts of ethylene glycol, and their temperature was raised to 140° C. under stirring. At that time point the pentaerythritol was dissolved, into which 0.2 part of dibutyltin oxide was charged, followed by charging of 129 parts of terephthalic acid, raising the temperature to 230° C. and maintaining the same temperature for an hour. Then the temperature was dropped to 180° C., 521 parts of soybean oil fatty acid and 210 parts of phthalic anhydride were charged, and 50 parts of xylene was added for refluxing. Raising the temperature again to 180° C., and then to 240° C. over a period of following 3 hours while removing water, and then maintained at 240° C. for 4 hours to obtain an alkyd resin. Subsequently the product was cooled and diluted by addition of 500 parts of mineral spirits, and an alkyd resin solution having about 62% of non-volatile content and having Gardner viscosity (25° C.) of YZ was obtained.

Comparative Example 2

Example 2 was repeated except that 179 parts of glycerine was used in place of the sum of 149 parts of pentaerythritol and 30 parts of ethylene glycol, to obtain an alkyd resin solution having about 62% of non-volatile content and having Gardner viscosity (25 ° C.) of V.

Comparative Example 3

Example 2 was repeated except that 151 parts of glycerine was used in place of the sum of 149 parts of pentaerythritol and 30 parts of ethylene glycol, and that the composition of the blend was altered to the one shown in later appearing Table 1, to obtain an alkyd resin solution having about 62% of non-volatile content and having Gardner viscosity (25° C.) of X.

Comparative Example 4

A reactor similar to the one used in Example 1 was charged with 179 parts of pentaerythritol which was heated to 140° C. but was not dissolved. Into which 0.2 part of dibutyltin oxide and 150 parts of regenerated PET were charged and heated to 240° C., but only partial melting resulted and an ester interchange reaction was not effected. Properties of the obtained resins are shown in Table 1.

TABLE 1

| | Example | | | | | | | Comparative Example | | |
|---|---|---|---|---|---|---|---|---|---|---|
| | 1 | 2 | 3 | 4 | 5 | 6 | 7 | 1 | 2 | 3 |
| Starting materials | | | | | | | | | | |
| pentaerythritol | 109 | 149 | 150 | 147 | 118 | 198 | 149 | 149 | — | — |
| glycerine | | | 5 | | | | | | 179 | 151 |
| ethylene glycol | 107 | 30 | | 33 | | 40 | 30 | 78 | | |
| diethylene glycol | | | | | 26 | | | | | |
| dibutyltin oxide | | 0.2 | | 0.2 | | | 0.2 | 0.2 | 0.2 | 0.2 |
| monobutyltin hydroxide | | | 0.1 | | 0.2 | | | | | |
| zinc acetate | 1.5 | | | | | 5.0 | | | | |
| litharge | | | | | | 5.0 | | | | |
| regenerated polyethylene terephthalate | 154 | 150 | 142 | 101 | 300 | 159 | 150 | | 150 | 151 |
| terephthalic acid | | | | | | | | 129 | | |
| trimethyl phosphate | | | | | | | 2.0 | | | |
| soybean oil fatty acid | 354 | 521 | 621 | 560 | 452 | | 521 | 521 | 521 | 538 |
| safflower oil | | | | | | 348 | | | | |
| phthalic anhydride | 340 | 210 | 148 | 221 | 151 | 307 | 210 | 210 | 210 | 221 |
| Physical Properties of Resin | | | | | | | | | | |
| number-average molecular weight | 2900 | 3900 | 4500 | 4300 | 4700 | 8000 | 3900 | 4200 | 1700 | 3400 |
| resin acid value (mgKOH/g) | 9.5 | 7.5 | 6.8 | 8.0 | 9.1 | 6.9 | 7.5 | 7.6 | 7.5 | 8.2 |
| resin hydroxyl value (mgKOH/g) | 45 | 37 | 15 | 25 | 20 | 130 | 36 | 37 | 69 | 11 |
| Gardner color number of resin solution | 7 | 7 | 7 | 7 | 7 | 7 | 2 | 7 | 7 | 7 |
| Gardner viscosity of resin solution (25° C.) | W | Y | Z | Z | $Z_1$ | Z | Y | YZ | V | X |
| appearance of resin solution | good | good | good | good | good | good | good | Turbidity occurred | good | good |

Test Examples 1–7 and Comparative Test Examples 1–3

Preparation of Paint Compositions and Test Panels

With 154 parts each of the alkyd resin solutions as obtained in above Examples and Comparative Examples, 0.6 part of 5% cobalt naphthenate solution and 2.5 parts of 12% zirconium naphthenate solution were mixed to provide clear paints.

Each of the formed clear paints was applied onto a piece of tin plate to a dry film thickness of 100 μm. The painted plates were allowed to stand in a 20° C. and 60% RH room and the time required for the paint films to give dry touch and the cure-drying time were measured. The hardness of the cure-dried paint films was also measured with könig's pendulum hardness tester. The test results are shown in Table 2.

TABLE 2

| Test No. | Alkyd resin (Example No.) | Dry touch-attaining time (hrs.) | Cure-dry-ing time (hrs.) | Paint film hardness (König's pendulum hardness tester) |
|---|---|---|---|---|
| Test Example 1 | Example 1 | 3 | 5 | 25 |
| Test Example 2 | Example 2 | 3 | 5 | 28 |
| Test Example 3 | Example 3 | 3 | 5 | 25 |
| Test Example 4 | Example 4 | 3 | 5 | 30 |
| Test Example 5 | Example 5 | 3 | 5 | 33 |
| Test Example 6 | Example 6 | 3 | 5 | 25 |
| Test Example 7 | Example 7 | 3 | 5 | 27 |
| Comparative Test Example 1 | Comparative Example 1 | 5 | 7 | 25 |
| Comparative Test Example 2 | Comparative Example 2 | 6 | 18 | 7 |
| Comparative Test Example 3 | Comparative Example 3 | 5 | 15 | 8 |

Example 8

A reactor equipped with a thermometer, stirrer, heating device and a rectification column was charged with 89 parts of pentaerythritol, 30 parts of ethylene glycol and 546 parts of soybean oil, which were heated to 140° C. under stirring. Into the system 5.0 parts of litharge and 5.0 parts of zinc acetate were charged, and the temperature was raised to 230° C. and maintained at the same level for 2 hours to effect an ester-interchange reaction (alcoholysis) of the soybean oil.

Then the temperature was dropped to 180° C., at which 150 parts of regenerated polyethylene terephthalate (regenerated PET) was charged, and the temperature was raised to 230° C. and maintained at the same level for 2 hours to effect depolymerization of said regenerated PET. Then dropping the temperature to 180° C., 237 parts of phthalic anhydride was charged, followed by addition of 50 parts of xylene for refluxing. The temperature was raised to 180° C., and thereafter to 240° C., consuming 3 hours while removing water. Then conducting dehydration condensation reaction at said temperature, an alkyd resin was obtained. Cooling and diluting the product with 610 parts of mineral spirits, an alkyd resin solution having about 60% of non-volatile content was obtained.

Examples 9–11

Example 8 was repeated except that the composition of the blend was varied as indicated in the following Table 3, to obtain alkyd resin solutions each having about 60% of non-volatile content. In Example 10, 0.5 part of dibutyltin oxide was used in place of 5.0 parts of zinc acetate.

Example 12

Example 8 was repeated except that 2.0 parts of trimethyl phosphate was added after depolymerization of regenerated PET, to obtain an alkyd resin solution having about 60% of non-volatile content.

Example 13

Example 8 was repeated except that 172 parts of regenerated polybutylene terephthalate was used in place of 150 parts of regenerated PET, to obtain an alkyd resin solution having about 60% of non-volatile content.

Example 14

A reactor similar to the one used in Example 8 was charged with 123 parts of pentaerythritol, 30 parts of ethylene glycol and 264 parts of soybean oil, which were heated to 140° C. under stirring. Into the system 5 parts of litharge and 5 parts of zinc acetate, and then 150 parts of regenerated polyethylene terephthalate (regenerated PET) were charged, and the temperature of the system was raised to 230° C. Maintaining the same temperature for 4 hours, an ester-interchange reaction of the soybean oil (alcoholysis) and depolymerization of the regenerated PET were simultaneously carried out. Then the temperature was brought down to 180° C., 222 parts of phthalic anhydride was charged and the temperature was raised to 180° C. and thereafter to 240° C. consuming the subsequent 3 hours while carrying out dehydration. After maintaining said temperature for 2 hours, 40 parts of xylene was added for refluxing and further the dehydrating comdensation reaction was conducted at 240° C., to obtain an alkyd resin. Then cooling and diluting the product by adding 490 parts of mineral spirits, an alkyd resin solution having about 60% of non-volatile content was obtained.

Comparative Example 4

A reactor similar to the one used in Example 8 was charged with 89 parts of pentaerythritol, 78 parts of ethylene glycol and 546 parts of soybean oil, which were heated to 140° C. under stirring. Into the system 5.0 parts of litharge and 5.0 parts of zinc acetate were charged, the temperature was raised to 230° C. and the system was maintained at the same temperature for 2 hours. Then the temperature was brought down to 180° C., 130 parts of terephthalic acid and 237 parts of phthalic anhydride were charged, and the temperature was raised to 180° C. Then the temperature was further raised to 240° C. over a period of subsequent 3 hours while dehydrating, and after maintaining the same temperature for 2 hours, 50 parts of xylene for refluxing was added. Further conducting the dehydrating condensation reaction at 240° C., an alkyd resin was obtained, which was cooled and diluted with 610 parts of minral spirits to provide an alkyd resin solution having about 60% of non-volatile content.

Comparative Example 5

Example 8 was repeated except that 119 parts of glycerine was used in place of the sum of 89 parts of pentaerythritol and 30 parts of ethylene glycol, to provide an alkyd resin solution having about 60% of non-volatile content.

Comparative Example 6

Example 8 was repeated except that 103 parts of glycerine was used in place of the sum of 89 parts of pentaerythritol and 30 parts of ethylene glycol, to provide an alkyd resin solution having about 60% of non-volatile content.

TABLE 3

|  | Example | | | | | | | Comparative Example | | |
| --- | --- | --- | --- | --- | --- | --- | --- | --- | --- | --- |
|  | 8 | 9 | 10 | 11 | 12 | 13 | 14 | 4 | 5 | 6 |
| Starting materials | | | | | | | | | | |
| pentaerythritol | 89 | 89 | 89 | 89 | 89 | 89 | 123 | 89 | — | — |
| glycerine |  | 29 |  |  |  |  |  |  | 119 | 103 |
| ethylene glycol | 30 |  |  | 6 | 30 | 30 | 30 | 78 |  |  |
| diethylene glycol |  |  | 51 |  |  |  |  |  |  |  |
| soybean oil | 546 | 546 | 546 | 546 | 546 | 546 | 264 | 546 | 546 | 546 |
| litharge | 5.0 | 5.0 | 5.0 | 5.0 | 5.0 | 5.0 | 5.0 | 5.0 | 5.0 | 5.0 |
| zinc acetate | 5.0 | 5.0 |  | 5.0 | 5.0 | 5.0 | 5.0 | 5.0 | 5.0 | 5.0 |
| dibutyltin oxide |  |  | 0.5 |  |  |  |  |  |  |  |
| regenerated polyethylene terephthalate | 150 | 150 | 150 | 225 | 150 |  | 150 | 150 | 150 | 150 |
| regenerated polybutylene terephthalate |  |  |  |  |  | 172 |  |  |  |  |

TABLE 3-continued

|  | Example | | | | | | | Comparative Example | | |
| --- | --- | --- | --- | --- | --- | --- | --- | --- | --- | --- |
|  | 8 | 9 | 10 | 11 | 12 | 13 | 14 | 4 | 5 | 6 |
| terephthalic acid |  |  |  |  |  |  |  | 130 |  |  |
| trimethyl phosphate |  |  |  |  | 2.0 |  |  |  |  |  |
| phthalic anhydride | 237 | 210 | 237 | 178 | 237 | 237 | 222 | 237 | 237 | 237 |
| Physical Properties of Resin |  |  |  |  |  |  |  |  |  |  |
| oil length (%) | 54 | 55 | 53 | 54 | 54 | 53 | 35 | 54 | 54 | 54 |
| number-average molecular weight | 4000 | 3700 | 4000 | 3800 | 4000 | 4100 | 3200 | 3900 | 2500 | 3900 |
| resin acid value (mgKOH/g) | 7.4 | 7.6 | 7.4 | 8.0 | 7.4 | 8.0 | 8.2 | 8.0 | 7.4 | 9.0 |
| resin hydroxyl value (mgKOH/g) | 24 | 45 | 24 | 26 | 25 | 24 | 115 | 25 | 46 | 20 |
| Gardner viscosity of resin solution (25° C.) | Y | XY | Y | X | Y | YZ | Z | X | V | X |
| Gardner color number of resin solution | 7 | 7 | 7 | 7 | 2 | 7 | 7 | 7 | 7 | 7 |
| appearance of resin solution | good | good | good | good | good | good | good | Turbidity occurred | good | good |

Test Examples 8–14 and Comparative Test Examples 4–6

Preparation of Paint Compositions and Test Panels

With 196 parts each of the alkyd resin solutions having about 60% of non-volatile content which were obtained in above Examples and Comparative Examples, 0.6 part of 5% cobalt naphthenate solution and 2.5 parts of 12% zirconium naphthenate solution were mixed to provide clear paints.

Each of the formed clear paints was applied onto a piece of tin plate to a dry film thickness of 100 μm. The painted plates were allowed to stand in a 20° C. and 60% RH room and the time required for the paint films to give dry touch and the cure-drying time were measured. The hardness of the cure-dried paint films was also measured with König's pendulum hardness tester. The test results were as given in Table 4.

TABLE 4

| Test No. | Alkyd resin (Example No.) | Dry touch-attaining time (hrs.) | Cure-drying time (hrs.) | Paint film hardness (König's pendulum hardness tester) |
| --- | --- | --- | --- | --- |
| Test Example 8 | Example 8 | 3 | 5 | 27 |
| Test Example 9 | Example 9 | 3 | 5 | 28 |
| Test Example 10 | Example 10 | 3 | 5 | 25 |
| Test Example 11 | Example 11 | 3 | 5 | 30 |
| Test Example 12 | Example 12 | 3 | 5 | 27 |
| Test Example 13 | Example 13 | 3 | 5 | 22 |
| Test Example 14 | Example 14 | 3 | 5 | 27 |
| Comparative Test Example 4 | Comparative Example 4 | 4 | 7 | 25 |
| Comparative Test Example 5 | Comparative Example 5 | 6 | 18 | 7 |
| Comparative Test Example 6 | Comparative Example 6 | 5 | 15 | 8 |

Example 15

A reactor equipped with a thermometer, stirrer, heating device and a rectification column was charged with 149 parts of pentaerythritol, 30 parts of ethylene glycol and 521 parts of soybean oil fatty acid, which were heated to 140° C. under stirring. After charging 5.0 parts of dibutyltin oxide, the temperature of the system. was raised to 230° C. over a period of 2 hours and maintained at the same level for further 2 hours to carry out the reaction. Then the temperature was brought down to 180° C., and 150 parts of regenerated polyethylene terephthalate (regenerated PET) and 5.0 parts of zinc acetate were charged. The temperature was raised to 230° C. and maintained at the same level for 2 hours to effect depolymerization of the regenerated PET. Then the temperature was brought down to 180° C., 210 parts of phthalic anhydride was charged, and 50 parts of xylene was added for refluxing. After raising the temperature to 180° C. and then to 240° C. over a period of 3 hours while removing water, a dehydration condensation reaction was conducted at the same temperature to obtain an alkyd resin. The product was cooled and diluted with 620 parts of mineral spirits to provide an alkyd resin solution having about 60% of non-volatile content.

Examples 16–19

Example 15 was repeated except that the composition of the blend was made as indicated in the following Table 5, to obtain alkyd resin solutions each having about 60% of non-volatile content.

Example 20

A reactor equipped with a thermometer, stirrer, heating device and a rectification column was charged with 119 parts of pentaerythritol, 30 parts of ethylene glycol, 347 parts of soybean oil fatty acid and 184 parts of soybean oil, which were heated to 140° C. under stirring. Into the system 5.0 parts of litharge and 5.0 parts of zinc acetate were charged, and the temperature was raised to 230° C. over a period of 2 hours and maintained at the same level for 2 hours to carry out the reaction. Then the temperature was brought down to 180° C., 150 parts of regenerated polyethylene terephthalate (regenerated PET) was charged and the temperature was raised to 230° C. Maintaining said temperature for 2 hours, depolymerization of the regenerated PET was conducted. The temperature was brought down to 180° C. then, 207 parts of phthalic anhydride was charged, 50 parts of xylene was added for refluxing, and the temperature was raised to 180° C. Thereafter the temperature was raised to 240° C. over a period of 3 hours while removing water, and the dehydration condensation reaction was conducted at said temperature to obtain an alkyd resin. The product was cooled and diluted by addition of 610 parts of mineral spirits, to obtain an alkyd resin solution having about 60% of non-volatile content.

Example 21–25

Example 20 was repeated except that the composition of the blend was made as indicated in the following Table 5, to obtain alkyd resin solutions each having about 60% of non-volatile content.

Example 26

Example 20 was repeated except that 2.0 parts of trimethyl phosphate was added after depolymerization of the regenerated PET, to obtain an alkyd resin solution having about 60% of non-volatile content.

Example 27

A reactor similar to the one used in Example 20 was charged with 119 parts of pentaerythritol, 30 parts of ethylene glycol, 347 parts of soybean oil fatty acid and 184 parts of soybean oil, which were heated to 140° C. under stirring. Into the system 5.0 parts of litharge and 5.0 parts of zinc acetate, and subsequently 150 parts of regenerated polyethylene terephthalate (regenerated PET), were charged. The temperature was raised to 230° C. over a period of 2 hours, and maintained at the same level for 4 hours to concurrently conduct the esterification, depolymerization of regenerated PET and ester-interchange reaction. Then the temperature was brought down to 180° C., 207 parts of phthalic anhydride was added and the temperature was elevated to 180° C. Thereafter the temperature was raised to 240° C. over a period of 3 hours, maintained at the same level for 2 hours while removing water, 50 parts of xylene for refluxing was added and further the dehydration condensation reaction was conducted at 240° C. to obtain an alkyd resin. The product was then cooled and diluted by addition of 610 parts of mineral spirits, to obtain an alkyd resin solution having about 60% of non-volatile content.

Comparative Example 7

A reactor similar to the one used in Example 15 was charged with 119 parts of pentaerythritol, 78 parts of ethylene glycol, 347 parts of soybean oil fatty acid and 184 parts of soybean oil, which were heated to 140° C. under stirring. Into the system 5.0 parts of litharge and 5.0 parts of zinc acetate were charged, and the temperature was raised to 230° C. over a period of 2 hours and maintained at the same level for 2 hours. Then the temperature was brought down to 180° C., 130 parts of terephthalic acid and 207 parts of phthalic anhydride were charged, and after the temperature was raised to 180° C., it was further raised to 240° C. over a period of 3 hours while removing water. Maintaining the same temperature for 2 hours, 50 parts of xylene for refluxing was added, and the dehydration condensation reaction was conducted at 240° C. to obtain an alkyd resin. Then the product was cooled and diluted by addition of 610 parts of mineral spirits to obtain an alkyd resin solution having about 60% of non-volatile content.

Comparative Example 8

Example 20 was repeated except that 136 parts of glycerine was used in place of the sum of 119 parts of pentaerythritol and 30 parts of ethylene glycol, and that the amount of the phthalic anhydride was changed from 207 parts to 230 parts, to provide an alkyd resin solution having about 60% of non-volatile content.

TABLE 5

| | Example | | | | | | | |
|---|---|---|---|---|---|---|---|---|
| Example No. | 15 | 16 | 17 | 18 | 19 | 20 | 21 | 22 |
| Starting materials | | | | | | | | |
| pentaerythritol | 149 | 154 | 154 | 147 | 154 | 119 | 119 | 119 |
| glycerine | | | | 46 | | | | |
| ethylene glycol | 30 | 6.2 | 30 | | | 30 | 30 | 6 |
| diethylene glycol | | | | | 51 | | | |
| soybean oil fatty acid | 521 | 520 | 260 | 520 | 520 | 347 | 260 | 347 |
| soybean oil | | | | | | | 184 | 272 | 184 |
| dibutyltin oxide | 5 | 5 | 5 | 5 | 5 | | | |
| litharge | | | | | | 5 | 5 | 5 |
| zinc acetate | 5 | 5 | 5 | 5 | 5 | 5 | 5 | 5 |
| regenerated PET | 150 | 225 | 150 | 150 | 150 | 150 | 150 | 225 |
| trimethyl phosphate | | | | | | | | |
| phthalic anhydride | 210 | 155.4 | 215 | 207 | 210 | 207 | 222 | 148 |
| terephthalic acid | | | | | | | | |
| refluxing xylene | 50 | 50 | 50 | 50 | 50 | 50 | 50 | 50 |
| mineral spirits | 620 | 620 | 620 | 620 | 620 | 610 | 610 | 610 |
| Physical Properties of Resin | | | | | | | | |
| number average molecular weight | 3900 | 4000 | 3700 | 4000 | 3900 | 4100 | 4100 | 3900 |
| resin acid value (mgKOH/g) | 7.5 | 7.3 | 7.6 | 7.6 | 7.3 | 7.4 | 7.3 | 7.5 |
| resin hydroxyl value (mgKOH/g) | 44 | 42 | 120 | 65 | 44 | 26 | 31 | 28 |

TABLE 5-continued

| | | | | | | | | |
|---|---|---|---|---|---|---|---|---|
| Gardner color number of resin solution | 7 | 7 | 7 | 7 | 7 | 7 | 7 | 7 |
| Gardner viscosity of resin solution (25° C.) | Y | Z | Z | Y | YZ | YZ | Z | Z |
| appearance of resin solution | good | good | good | good | good | good | good | good |

| | Example | | | | | Comparative Example | |
|---|---|---|---|---|---|---|---|
| Example No. | 23 | 24 | 25 | 26 | 27 | 7 | 8 |
| Starting materials | | | | | | | |
| pentaerythritol | 126 | 119 | 119 | 119 | 119 | 119 | |
| glycerine | | 46 | | | | | 136 |
| ethylene glycol | 30 | | | 30 | 30 | 78 | |
| diethylene glycol | | | 51 | | | | |
| soybean oil fatty acid | 174 | 347 | 347 | 347 | 347 | 347 | 347 |
| soybean oil | 88 | 184 | 184 | 184 | 184 | 184 | 184 |
| dibutyltin oxide | | | | | | | |
| litharge | 5 | 5 | 5 | 5 | 5 | 5 | 5 |
| Zinc acetate | 5 | 5 | 5 | 5 | 5 | 5 | 5 |
| regenerated PET | 150 | 150 | 150 | 150 | 150 | | 150 |
| trimethyl phosphate | | | | 2 | | | |
| phthalic anhydride | 200 | 207 | 207 | 207 | 207 | 207 | 230 |
| terephthalic acid | | | | | | 129 | |
| refluxing xylene | 50 | 50 | 50 | 50 | 50 | 50 | 50 |
| mineral spirits | 610 | 610 | 610 | 610 | 610 | 610 | 610 |
| Physical Properties of Resin | | | | | | | |
| number-average molecular weight | 3800 | 3900 | 4100 | 3900 | 3900 | 4200 | 3400 |
| resin acid value (mgKOH/g) | 7 | 7.3 | 7.5 | 7.4 | 7.4 | 7.4 | 8.2 |
| resin hydroxyl value (mgKOH/g) | 103 | 56 | 25 | 44 | 44 | 26 | 17 |
| Gardner color number of resin solution | 7 | 7 | 7 | 2 | 7 | 7 | 7 |
| Gardner viscosity of resin solution (25° C.) | Z | Y | YZ | XY | YZ | YZ | X |
| appearance of resin solution | good | good | good | good | good | Turbidity occurred | good |

Test Examples 15–27 and Comparative Test Examples 7–8

Preparation of Paint Compositions and Test Panels

With 196 parts each of the alkyd resin solutions as obtained in above Examples and Comparative Examples, 0.6 part of 5% cobalt naphthenate solution and 2.5 parts of 12% zirconium naphthenate solution were mixed to provide clear paints.

Each of the formed clear paints was applied onto a piece of tin plate to a dry film thickness of 100 μm. The painted plates were allowed to stand in a 20° C. and 60% RH room and the time required for the paint films to give dry touch and the cure-drying time were measured. The hardness of the cure-dried paint films was also measured with König's pendulum hardness tester. The test results are shown in the following Table 6.

TABLE 6

| Test No. | Alkyd resin (Example No.) | Dry touch-attaining time (hrs.) | Cure-drying time (hrs.) | Paint film hardness (König's pendulum hardness tester) |
|---|---|---|---|---|
| Test Example 15 | Example 15 | 3 | 5 | 27 |
| Test Example 16 | Example 16 | 3 | 5 | 34 |
| Test Example 17 | Example 17 | 3 | 5 | 30 |
| Test Example 18 | Example 18 | 3 | 5 | 28 |
| Test Example 19 | Example 19 | 3 | 5 | 26 |
| Test Example 20 | Example 20 | 3 | 5 | 28 |
| Test Example 21 | Example 21 | 3 | 5 | 28 |
| Test Example 22 | Example 22 | 3 | 5 | 32 |
| Test Example 23 | Example 23 | 3 | 5 | 30 |
| Test Example 24 | Example 24 | 3 | 5 | 28 |
| Test Example 25 | Example 25 | 3 | 5 | 27 |
| Test Example 26 | Example 26 | 3 | 5 | 27 |

TABLE 6-continued

| Test No. | Alkyd resin (Example No.) | Dry touch-attaining time (hrs.) | Cure-drying time (hrs.) | Paint film hardness (König's pendulum hardness tester) |
|---|---|---|---|---|
| Test Example 27 | Example 27 | 3 | 5 | 28 |
| Comparative Test Example 7 | Comparative Example 7 | 4 | 7 | 30 |
| Comparative Test Example 8 | Comparative Example 8 | 6 | 18 | 8 |

INDUSTRIAL APPLICABILITY

According to the processes of the present invention, transparent alkyd resins, which are nearly free of occurrence of foreign matters or filtration residues, can be prepared within a short time, using polyester resins which are recovered from waste materials and regenerated. The processes of the invention utilize waste materials and, therefore, enable recycled utilization of disused PET bottles and the like.

Also alkyd resins which are obtained through the processes of the invention can be conveniently used as resins for room temperature-curing type paints, or those for thermosetting type paints, in combination with curing agents. Furthermore, the alkyd resins obtained by the processes of the invention are transparent and free of turbidity, although they contain terephthalic acid component, and are soluble in weak solvent such as mineral spirits. The resins, therefore, can be conveniently used also as resins for paints for the use where overcoatability is required.

What is claimed is:

1. A process for producing an alkyd resin having an oil length of 30–70%, which is characterized by comprising dissolving polyester resin whose chief starting material is terephthalic acid and which has been recovered from waste materials and regenerated, in an alcohol mixture of tetra- or higher hydric alcohol with tri- or lower polyhydric alcohol, the weight ratio of the former/latter being within a range of 0.2–50, depolymerizing the same in the presence of a depolymerization catalyst, and then adding thereto a polybasic acid component and a fatty acid component to effect an esterification reaction, the used amount of said polyester resin being 5–40% by weight, based on the sum of the polyester resin, the alcohol mixture, the polybasic acid component and the fatty acid component.

2. A process for producing an alkyd resin having an oil length of 30–70%, which is characterized by comprising dissolving polyester resin whose chief starting material is terephthalic acid and which has been recovered from waste materials and regenerated, in a mixture of an alcohol component, in which the weight ratio of tri- or lower polyhydric alcohol to tetra- or higher hydric alcohol as the former/latter is within a range of 0–20, with oil and fat and/or fatty acid, or in their reaction mixture; depolymerizing the same in the presence of a depolymerization catalyst; and then adding thereto a polybasic acid component to effect an esterification reaction, the used amount of said polyester resin being 5–40% by weight, based on the sum of the polyester resin, the alcohol component, the oil and fat and/or the fatty acid and the polybasic acid component.

3. A process according to claim 1 or 2, in which the polyester resin is recycled polyethylene terephthalate.

4. A process according to claim 1 or 2, in which the tetra- or higher hydric alcohol is selected from the group consisting of diglycerine, triglycerine, pentaerythritol, dipentaerythritol and sorbitol.

5. A process according to claim 1 or 2, in which the tetra- or higher hydric alcohol is pentaerythritol.

6. A process according to claim 1 or 2, in which the tri- or lower polyhydric alcohol is selected from the group consisting of trimethylolpropane, trimethylolethane, glycerine, ethylene glycol, diethylene glycol, triethylene glycol, propylene glycol, 1,3-propanediol, 1,4-butanediol, 1,5-pentanediol, neopentyl glycol, 1,6-hexanediol and 1.4-dimethylolcyclohexane.

7. A process according to claim 1 or 2, in which the tri- or lower polyhydric alcohol is glycerine, ethylene glycol, diethylene glycol, triethylene glycol or propylene glycol.

8. A process according to claim 1, in which the weight ratio of the tetra- or higher hydric alcohol/the tri- or lower polyhydric alcohol in the alcohol mixture lies within a range of 1–20.

9. A process according to claim 2, in which the weight ratio of the tri- or lower polyhydric alcohol/the tetra- or higher hydric alcohol lies within a range of 0.02–10.

10. A process according to claim 2, in which the oil and fat is semi-drying oil or drying oil, and the fatty acid is semi-drying oil fatty acid or drying oil fatty acid.

11. A process according to claim 2, in which the reaction product of the alcohol component with the oil and fat and/or the fatty acid is an esterification reaction and/or ester-interchange reaction product.

12. A process according to claim 1, in which the polyester resin is used in an amount of 15–80 parts by weight per 100 parts by weight in total of the polyester resin and the alcohol mixture.

13. A process according to claim 1, in which the polyester resin is used in an amount of 20–70 parts by weight per 100 parts by weight in total of the polyester resin and the alcohol mixture.

14. A process according to claim 2, in which the polyester resin is used in an amount of 15–80 parts by weight per 100 parts by weight in total of the polyester resin, the alcohol component and the oil and fat and/or the fatty acid.

15. A process according to claim 2, in which the polyester resin is used in an amount of 20–70 parts by weight per 100 parts by weight in total of the polyester resin, the alcohol component and the oil and fat and/or the fatty acid.

16. A process according to claim 2, in which the polyester resin is dissolved in a reaction product of the alcohol component with the oil and fat and/or the fatty acid, and its depolymerization is conducted.

17. A process according to claim 1 or 2, in which the depolymerization catalyst is selected from the group consisting of monobutyltin hydroxide, dibutyltin oxide, monobutyltin-2-ethyl hexanoate, dibutyltin dilaurate, stannous oxide, tin acetate, zinc acetate, manganese acetate, cobalt acetate, calcium acetate, lead acetate, antimony trioxide, tetrabutyl titanate and tetraisopropyl titanate.

18. A process according to claim 1, in which the depolymerization catalyst is used in an amount ranging from 0.005 to 2 parts by weight per 100 parts by weight of the sum of the polyester resin and the alcohol mixture.

19. A process according to claim 2, in which the depolymerization catalyst is used in an amount ranging from 0.005 to 5 parts by weight per 100 parts by weight of the sum of the polyester resin, the alcohol component, the oil and fat and/or the fatty acid.

20. A process according to claim 1 or 2, in which the depolymerization is carried out at a temperature between 140 and 250° C.

21. A process according to claim 1 or 2, in which a minor amount of a phosphorus compound is added to the depolymerization product.

22. A process according to claim 1 or 2, in which the polybasic acid component is a dibasic acid selected from the group consisting of phthalic anhydride, isophthalic acid, terephthalic acid, tetrahydrophthalic anhydride, hexahydrophthalic anhydride, naphthalenedicarboxylic acid, 4,4'-biphenyldicarboxylic acid, diphenylmethane-4,4'-dicarboxylic acid, succinic acid, fumaric acid, adipic acid, sebacic acid and maleic anhydride, or its $C_1$–$C_6$ alkyl ester.

23. A process according to claim 1, in which the fatty acid component is a drying oil fatty acid or a semi-drying oil fatty acid.

24. A process according to claim 1, in which the polybasic acid component and the fatty acid component are used at such a ratio that the carboxyl equivalent number in the sum of the polybasic acid component and the fatty acid component per one hydroxyl equivalent in the alcohol mixture lies within a range of 0.8–1.

25. A process according to claim 2, in which the polybasic acid component is used at such a ratio that the carboxyl equivalent number of the polybasic acid component per one hydroxyl equivalent in the alcohol component lies within a range of 0.5–1.

26. A process according to claim 1, in which the polyester resin is used in an amount of 10–35% by weight, based on the sum of the polyester resin, the alcohol mixture, the polybasic acid component and the fatty acid component.

27. A process according to claim 2, in which the polyester resin is used in an amount of 10–35% by weight, based on the sum of the polyester resin, the alcohol component, the oil and fat and/or the fatty acid and the polybasic acid component.

28. A process according to claim 1 or 2, in which the alkyd resin has an oil length of 40–60%.

29. Alkyd resins which are prepared by a process as defined in claim 1 or 2.

30. Paint compositions having the alkyd resins which are prepared by a process as defined in claim 1 or 2.

* * * * *